Dec. 14, 1943. J. V. GIESLER 2,336,858
ADJUSTABLE AUTOMOBILE THERMOSTAT
Filed May 6, 1942
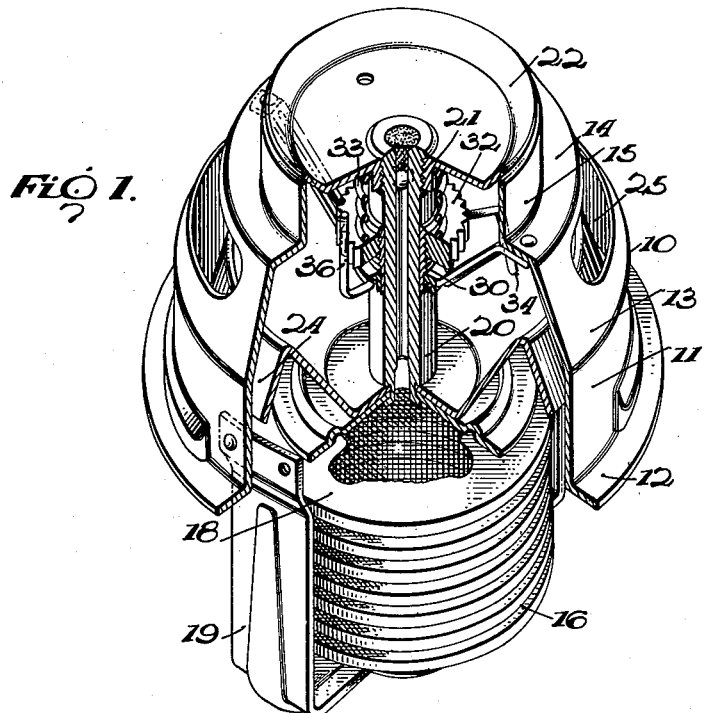
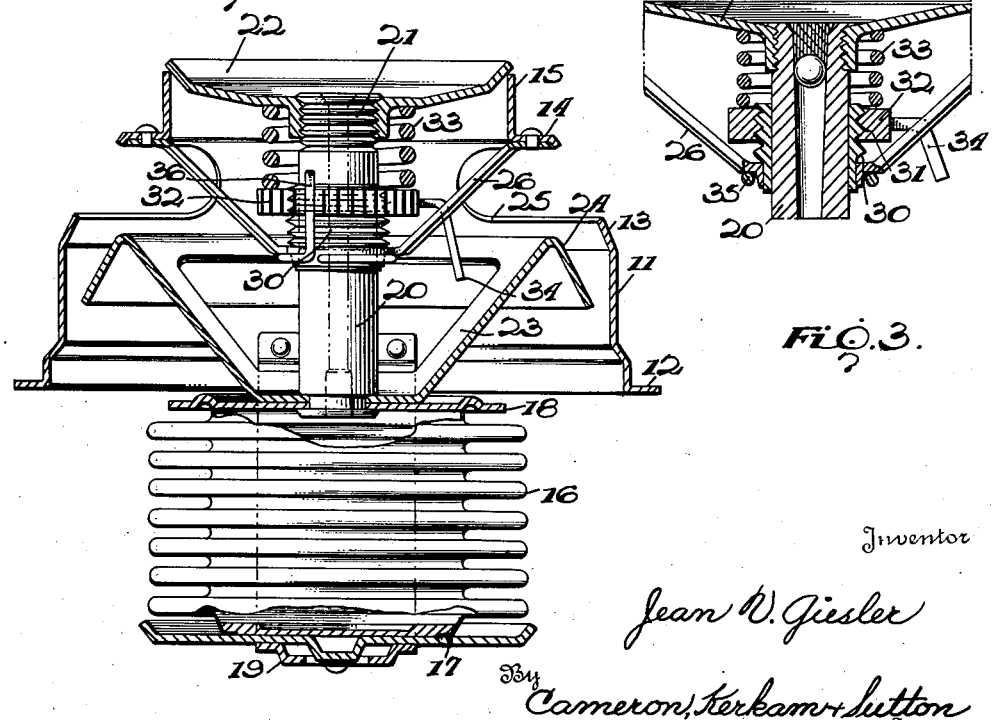
Inventor
Jean V. Giesler
By Cameron, Kerkam + Sutton
Attorneys Patented Dec. 14, 1943

2,336,858

UNITED STATES PATENT OFFICE 2,336,858

ADJUSTABLE AUTOMOBILE THERMOSTAT

Jean V. Giesler, Knoxville, Tenn., assignor to The Fulton Sylphon Company, Knoxville, Tenn., a corporation of Delaware Application May 6, 1942, Serial No. 441,960

2 Claims. (Cl. 236—34)

This invention relates to temperature regulators, and more particularly to temperature regulators for the cooling systems of internal combustion engines of the type employing thermostatically operated valve mechanism for controlling the circulation of cooling medium through the cooling system of the engine.

It has heretofore been proposed to provide a temperature regulator of the type referred to wherein a thermostat operates coaxially mounted valves on the stem of the thermostat for respectively controlling end and lateral openings in a tubular housing. It is sometimes desirable to be able to adjust such a regulator so as to variably predetermine the temperature at which the thermostat moves the valve members, and it is an object of this invention to provide a temperature regulator of the type referred to which includes means whereby the regulator may be readily adjusted to predetermine its effective temperature range.

Another object of this invention is to provide a device of the type just characterized wherein the temperature adjusting mechanism is so constructed and arranged as not to materially obstruct the flow of cooling water through the regulator.

Another object of this invention is to provide a device of the type characterized which is simple in construction, easy to manipulate and inexpensive to produce.

Other objects will appear as the description of the invention proceeds.

The invention is capable of receiving a variety of mechanical expressions, one of which is shown on the accompanying drawing, but it is to be expressly understood that the drawing is for purposes of illustration only, and is not to be construed as a definition of the limits of the invention, reference being had to the appended claims for that purpose.

Referring in detail to the drawing, wherein the same reference characters are used to designate corresponding parts in the several figures:

Fig. 1 is a perspective view partly broken away of an embodiment of the present invention;

Fig. 2 is an axial section of said embodiment; and

Fig. 3 is a fragmentary axial section of the adjusting mechanism.

The present invention may be embodied in temperature regulators of a wide variety of constructions, one known form of regulator for operating main and by-pass valves having been selected for purposes of exemplifying the invention.

In the form illustrated, a tubular housing 10, which may be of any suitable construction, is shown as composed of a generally cylindrical portion 11, which may terminate at one end in a flange 12 to facilitate the mounting of said housing in position, a frusto-conical portion 13, which may terminate in a shoulder 14, and a cylindrical terminal portion 15. Suitably mounted in or from said housing 10 is a thermostat 16 of any suitable construction, here shown as in the form of an expansible and collapsible corrugated tubular metal container or bellows having a stationary end wall 17 and a movable end wall 18. Thermostat 16 is charged with any suitable thermosensitive fluid, and is mounted in any suitable way, as by a strap 19 which may be attached at its ends, as by rivets, to the tubular wall of the housing 10 and which at an intermediate point has the stationary end wall 17 of said thermostat fixedly attached thereto. Suitably attached to the movable end wall 18 of said thermostat is a stem 20 to the free end of which is suitably attached, as by screw threads 21, a valve member 22, here shown as in the form of a dished plate, for cooperation with the end of the tubular section 15 which serves as a valve seat. Also suitably mounted on the valve stem 20, and here shown as fixed to movable end wall 18 by said stem 20, is a spider 23 terminating in a frusto-conical flange 24, said flange 24 having the same angularity to the axis of the structure as has the frusto-conical wall 13. Frusto-conical wall 13 is provided with suitable openings 25, and the flange 24 is of such width that when said flange 24 engages said frusto-conical wall 13, said flange closes the openings 25. In place of a continuous flange 24, segments of a flange may be connected to the arms of the spider 23, said segments being of sufficient extent to close the openings 25 when engaged with the wall 13. Suitably attached to the housing, as at shoulder 14, is a second spider 26 which in structures heretofore employed has carried a guide member or sleeve for the stem 20.

As so far described, the temperature regulator is of known construction, and when suitably mounted, as in a water jacket for example, with the thermostat 16 subjected to the temperature of the water and suitable main and by-pass conduits communicating with the end opening provided by the tubular wall 15 and the openings 25, said regulator controls the circulation of cooling medium in a known way. When the cooling medium is cold, thermostat 16 is contracted, valve member 22 is engaged with its seat 15 and valve member 24 is in its position most remote from the openings 25, so that cooling medium entering the tubular housing 10 flows out only through the openings 25. When the temperature of the cooling medium reaches a predetermined degree the thermostat 16 begins to expand, moving valve member 22 away from its seat 15 and causing valve member 24 to approach its opposed wall 13 until, with continued rise in temperature, the valve member 24 closes the openings 25 and valve member 22 is in its position most remote from its seat 15, thereby causing the circulation to take place through the end opening provided by the tubular wall 15.

As before noted, it is sometimes desirable to vary the temperature at which the thermostat starts to expand, and if such provision for adjustment is to properly serve its purpose, it should afford a minimum opposition to the flow of the cooling medium through the housing 10 while providing a simple and readily manipulated means for effecting the desired adjustment. As here shown, the member 30 carried by the spider 26 and which slidingly receives stem 20 so as to constitute a guide for the opening and closing movements of the valve mechanism is provided with exterior threads 31 on which is threaded a suitable spring seat, here shown as in the form of an interiorly threaded collar 32. Interposed between said collar 32 and the valve member 22 is a coil spring 33 of suitable resiliency so that by movement of said collar 32 within its operating range on the threads 31 the tension of said spring may be varied within the limits suitable for affording the thermostat the desired adjustment. Any suitable means may be provided for moving the collar 32, said collar here being shown as having suitably attached thereto an arm 34 which is accessible through one or more of the openings 25. If desired, means may also be provided to prevent movement of the collar 32 except when positively moved by the arm 34, and to this end the periphery of the collar 32 is shown as serrated and suitably mounted on the spider 26 or lower extremity of the member 30 is a retaining member 35 which may be in the form of a wire clip snapped into position and having a resilient arm 36 engaging said serrations to lock the collar in position but sufficiently yieldable when the arm 34 is operated to permit movement of the collar as aforesaid.

It will thus be perceived that the provision for adjustment here introduced utilizes the valve stem guide with a minimum of additional parts, while avoiding complication of the construction and interference with the free flow of cooling medium through the housing 10.

While the invention has thus been described in detail as embodied in one particular form of temperature regulator now known to the art, it will be apparent that the invention may be embodied in regulators of widely different construction. Therefore it is to be expressly understood that the invention is not restricted to the regulator shown as the details of the regulator itself forms no part of the present invention otherwise than as herein indicated. Changes may also be made in the details of construction and arrangement of the parts in the provision for adjustment without departing from the present invention. Reference is therefore to be had to the appended claims for a definition of said invention.

What is claimed is:

1. In a temperature regulator for the cooling system of an internal combustion engine of the type employing a thermostat, a stem extending therefrom, main and by-pass valve members operated by said stem and a guide means interposed between said main and by-pass valve members and cooperating with said stem to guide the movements of said valve members under the operation of said thermostat, the improvement which includes a tubular member carried by said guide means intermediate said main and by-pass valve members, said tubular member being externally threaded, a spring plate threadedly mounted on said tubular member, a coil spring surrounding said valve stem and interposed between said spring plate and one of said valve members for resiliently urging said valve members in one direction, and an arm projecting from said spring plate to a position where it is accessible through the port for one of said valve members for rotating said spring plate and adjusting the tension of said coil spring.

2. In a temperature regulator for the cooling system of an internal combustion engine of the type employing a thermostat, a stem extending therefrom, main and by-pass valve members operated by said stem and a guide means interposed between said main and by-pass valve members and cooperating with said stem to guide the movements of said valve members under the operation of said thermostat, the improvement which includes a tubular member carried by said guide means intermediate said main and by-pass valve members, said tubular member being externally threaded, a spring plate threadedly mounted on said tubular member, a coil spring surrounding said valve stem and interposed between said spring plate and one of said valve members for resiliently urging said valve members in one direction, an arm projecting from said spring plate to a position where it is accessible through the port for one of said valve members for rotating said spring plate and adjusting the tension of said coil spring, and means carried by said guide means for yieldably engaging said spring plate and restraining the same against accidental displacement.

JEAN V. GIESLER.